US012287663B2

(12) United States Patent
Michal et al.

(10) Patent No.: US 12,287,663 B2
(45) Date of Patent: Apr. 29, 2025

(54) BANDGAP CIRCUIT

(71) Applicants: STMicroelectronics (Grenoble 2) SAS, Grenoble (FR); STMicroelectronics (Alps) SAS, Grenoble (FR)

(72) Inventors: Vratislav Michal, Fontanil-Cornillon (FR); Regis Rousset, Corenc (FR)

(73) Assignees: STMicroelectronics (Grenoble 2) SAS, Grenoble (FR); STMicroelectronics (Alps) SAS, Grenoble (FR)

( * ) Notice: Subject to any disclaimer, the term of this patent is extended or adjusted under 35 U.S.C. 154(b) by 322 days.

(21) Appl. No.: 17/707,321

(22) Filed: Mar. 29, 2022

(65) Prior Publication Data

US 2022/0317719 A1 Oct. 6, 2022

(30) Foreign Application Priority Data

Mar. 31, 2021 (FR) ....................................... 2103307

(51) Int. Cl.
*G05F 3/30* (2006.01)

(52) U.S. Cl.
CPC ....................................... *G05F 3/30* (2013.01)

(58) Field of Classification Search
CPC . G05F 3/30; G05F 3/267; G05F 3/222; G05F 3/225; G05F 3/245
See application file for complete search history.

(56) References Cited

U.S. PATENT DOCUMENTS

| | | | | |
|---|---|---|---|---|
| 5,966,039 | A * | 10/1999 | Koglin | G05F 3/225 327/356 |
| 7,436,243 | B1 | 10/2008 | Doyle et al. | |
| 2004/0239303 | A1* | 12/2004 | Feng | G05F 3/30 323/313 |
| 2006/0071705 | A1* | 4/2006 | Teel | G05F 3/30 327/539 |
| 2006/0152206 | A1* | 7/2006 | Yu | G05F 3/30 323/313 |
| 2022/0115904 | A1* | 4/2022 | Delshadpour | H02J 9/068 |

OTHER PUBLICATIONS

INPI Search Report and Written Opinion for priority application, FR Appl. No. 2103307, report dated Dec. 3, 2021, 7 pages.

* cited by examiner

*Primary Examiner* — Alex Torres-Rivera
(74) *Attorney, Agent, or Firm* — Crowe & Dunlevy LLC

(57) ABSTRACT

A band-gap circuit for generating a bandgap reference signal includes a first bipolar transistor and a second bipolar transistor of a same type among PNP and NPN types. The first and second bipolar transistors are configured to generate a current varying proportionally with the temperature. A capacitor is connected between a base and an emitter of one or both of the first and second bipolar transistors.

8 Claims, 2 Drawing Sheets

BANDGAP CIRCUIT

PRIORITY CLAIM

This application claims the priority benefit of French Application for Patent No. 2103307, filed on Mar. 31, 2021, the content of which is hereby incorporated by reference in its entirety to the maximum extent allowable by law.

TECHNICAL FIELD

The present disclosure relates generally to electronic circuits and, more particularly, to bandgap circuits.

BACKGROUND

Band-gap circuits for generating a band-gap reference signal, such as a current or voltage, having a value that does not change when the temperature of the circuit changes, are known.

Among these known band-gap circuits, circuits using at least two bipolar transistors of the same type among PNP and NPN types to generate the reference signal are known. In these circuits, a difference between a base-emitter voltage, i.e., the voltage between the base and the emitter, of a first of the two bipolar transistors and a base-emitter voltage of a second of the two bipolar transistors, when operating with different current densities in their base-emitter junctions, is used to generate a voltage (or current) that varies proportionally with temperature (i.e., a voltage (or current) that increases when the temperature increases, and decreases when the temperature decreases). In addition, the base-emitter voltage of a bipolar transistor, for example one of the two bipolar transistors in the band-gap circuit or an additional bipolar transistor in that circuit, is used to generate a voltage (or current) that varies in an inversely proportional manner with temperature (i.e., it decreases as the temperature increases and increases as the temperature decreases). The voltage (or current) proportional to the temperature and the voltage (or current) that are inversely proportional are then used to generate a reference voltage (or current) that does not vary with temperature.

However, when such a band-gap circuit is subjected to electromagnetic interference (EMI), for example because the circuit is located in the vicinity of an antenna transmitting an electromagnetic signal, for example a radio frequency signal, the operation of the circuit is impacted and the value of the reference voltage (or current) is modified by the electromagnetic interference.

When the value of the reference signal provided by a band-gap circuit is changed by electromagnetic interference to the circuit, it impacts the operation of an electronic system comprising the circuit. For example, if the reference signal is a current used in a reference current ring oscillator providing a periodic signal, a change in the value of the reference current causes a change in the frequency of the periodic signal.

There is a need to overcome some or all of the drawbacks of known band-gap circuits for generating a reference signal whose operation is based on the variation of the base-emitter voltage of bipolar transistors with temperature.

For example, there is a need to reduce or even eliminate the influence of electromagnetic interference on the value of the reference signal provided by such circuits.

SUMMARY

An embodiment addresses all or some of the drawbacks of known band-gap circuits for generating a reference signal whose operation is based on the variation of the base-emitter voltage of the bipolar transistors with temperature.

For example, an embodiment reduces or even eliminates the influence of electromagnetic interference on the value of the reference signal provided by such circuits.

An embodiment provides a band-gap circuit for generating a reference signal comprising a first bipolar transistor and a second bipolar transistor of a same type among PNP and NPN types, the first and second transistors being configured to generate a current that varies proportionally with temperature, wherein a first capacitor is connected between a base and an emitter of the first transistor.

According to an embodiment, a capacitance value of the first capacitor is at least five times, preferably at least ten times, larger than a capacitance value of an intrinsic capacitance of a base-emitter junction of the first transistor.

According to an embodiment, the first transistor has a larger emitter area than the second transistor.

According to an embodiment, a second capacitor is connected between a base and an emitter of the second transistor.

According to an embodiment, a capacitance value of the second capacitor is at least five times, preferably at least ten times, larger than a capacitance value of an intrinsic capacitance of a base-emitter junction of the second transistor.

According to an embodiment, the first and second transistors are NPN.

According to an embodiment, the circuit is of the Brokaw type.

According to an embodiment: the base of the first transistor is connected to the base of the second transistor; the emitter of the first transistor is connected to a first terminal of a first resistor, a second terminal of the first resistor being connected to a first node; a first terminal of a second resistor is connected to the first node, a second terminal of the second resistor being connected to a second node configured to receive a reference potential; the emitter of the second transistor is connected to the first node; and a circuit configured to cause a collector current of the first transistor to equal a collector current of the second transistor couples the collector of the first transistor and the collector of the second transistor to a third node configured to receive a positive supply potential relative to the reference potential.

According to an embodiment: a current mirror, preferably a MOS transistor, is connected to a first node configured to receive a positive supply potential relative to a reference potential, the current mirror being connected to the collector of the first transistor and the collector of the second transistor and being configured so that a collector current of the first transistor is equal to a collector current of the second transistor; a follower amplifier has an input connected to the collector of the first transistor and an output connected to the base of the second transistor; a first resistor is connected between the base of the second transistor and the base of the first transistor; a second resistor is connected between the base of the first transistor and a second node configured to receive the reference potential; and a third resistor is connected between the emitter of the second transistor and the second node.

According to an embodiment, the first and second transistors are of the PNP type.

According to an embodiment, the circuit is of the Brokaw type.

According to an embodiment: the base and the collector of the first transistor and the second transistor are connected to a first node configured to receive a reference potential; a first resistor is connected between the emitter of the second transistor and a second node; and a circuit connected to the emitter of the first transistor and the second node is configured to equalize a potential of the emitter of the first transistor and a potential of the second node, and to equalize a collector current of the first transistor with a collector current of the second transistor.

An embodiment provides a power-on reset circuit comprising a band-gap circuit as described.

According to an embodiment: the band-gap circuit is configured to generate a reference voltage; and a voltage comparator is configured to receive the reference voltage and a supply voltage, and to provide a binary signal whose state is representative of a comparison of the supply voltage with the reference voltage.

An embodiment provides a manufacturing method comprising: simulating electromagnetic interference in a band-gap circuit for generating a reference signal, the circuit comprising a first bipolar transistor and a second bipolar transistor of a same type among PNP and NPN types, the first and second transistors being configured to generate a current varying proportionally with temperature; identifying, based on the simulation results, which of the first and second transistors causes most variation in the reference signal when the circuit is subjected to electromagnetic interference; and manufacture the circuit by adding a capacitor connected between the base and emitter of the identified transistor.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Figure 1:
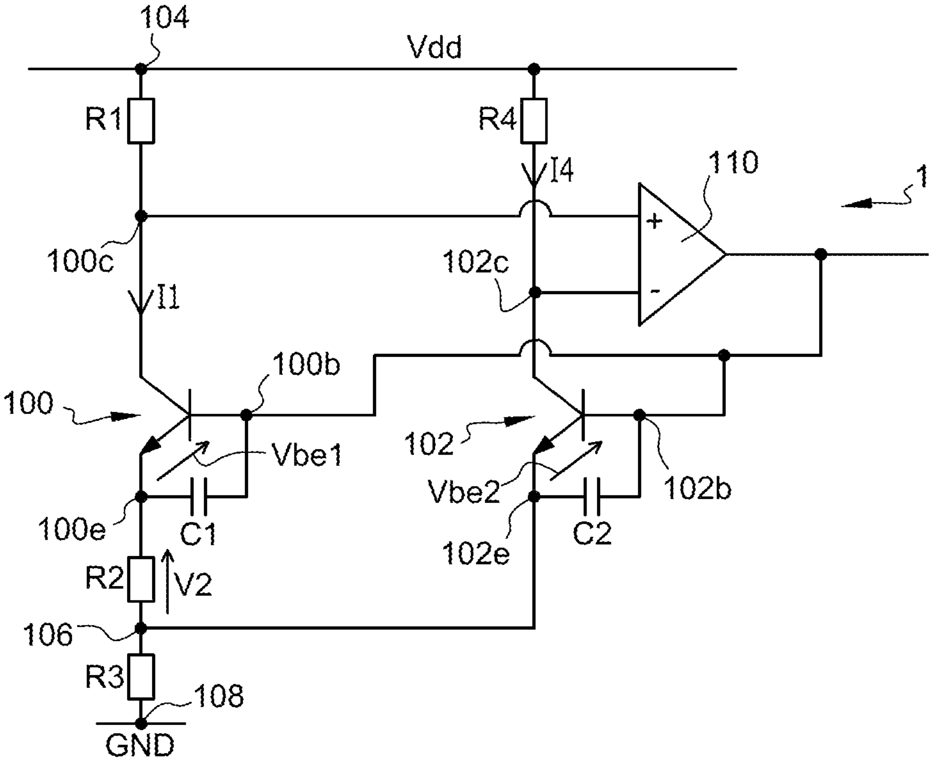
FIG. 1 represents an embodiment of a band-gap circuit for generating a reference signal.

Like features have been designated by like references in the various figures. In particular, the structural and/or functional features that are common among the various embodiments may have the same references and may dispose identical structural, dimensional, and material properties.

For the sake of clarity, only the operations and elements that are useful for an understanding of the embodiments described herein have been illustrated and described in detail. In particular, not all of the usual band-gap circuits for generating a reference signal have been detailed, nor has the usual operation of these usual circuits been detailed, the embodiments and variants described being compatible with these usual circuits and their usual operations.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation represented in the figures.

Unless specified otherwise, the expressions "around", "approximately", "substantially" and "in the order of" signify within 10%, and preferably within 5%.

The present disclosure proposes to reduce or even eliminate the influence of electromagnetic interference on the value of a reference signal generated by a band-gap circuit subjected to such interference. For this purpose, a capacitor is connected between the base and the emitter of at least one of the two bipolar transistors of the circuit which are configured to generate the signal (voltage or current) varying proportionally with the temperature. In other words, the present description proposes adding a capacitor connected between the base and emitter of at least one of the two bipolar transistors that are configured to cause the difference between the base-emitter voltage of one of the two transistors and the base-emitter voltage of the other of the two transistors to vary proportionally with temperature.

The addition of this capacitor is based on the observation that, in a band-gap circuit for generating a reference signal based on bipolar transistors, variations in the value of the reference signal resulting from electromagnetic interference (EMI) of the circuit are mostly due to interference-induced variations in the base-emitter radio frequency (RF) current of the two bipolar transistors that are configured to generate the signal proportional to temperature.

The provision of this or these capacitors makes it possible to avoid the use of a shield against electromagnetic interference for the band-gap circuit. Indeed, such shields are cumbersome and not always effective.

The provision of such capacitors is also more efficient than the provision of filters arranged on a power supply network of an integrated electronic circuit or system comprising the band-gap circuit, and/or on the pads of the integrated circuit or system.

For example, it has been found that a band-gap circuit as described above can provide a reference signal that varies in value by less than 1% in the presence of radio frequency magnetic fields having an amplitude of up to twenty amperes per meter.

In the present disclosure, a capacitor is said to be connected between the base and emitter of a bipolar transistor, for example, when a first electrode of the capacitor is connected to the base of the transistor, and a second electrode of the capacitor is connected to the emitter of the transistor.

In the present disclosure, the electromagnetic interference is, for example, radio frequency interference having frequencies between 30 MHz and 30 GHz, for example between about 700 MHz and about 6 GHz.

In the remainder of the disclosure, a value X varies proportionally with temperature T, for example, if there is a non-zero positive proportionality coefficient A such that X=A*T+B, with B a constant value. In other words, the value X varies proportionally with temperature T if the derivative of the value X relative to the temperature T is positive and not zero. In this case, an increase, respectively a decrease, in temperature leads to an increase, respectively a decrease, in the value X.

Similarly, in the following disclosure, the value X varies inversely with temperature T, for example, if there is a non-zero negative proportionality coefficient C such that X=C*T+D, with D a constant value. In other words, the value X varies inversely with temperature T if the derivative of the value X relative to the temperature T is negative and not zero. In this case, an increase, respectively a decrease in temperature, leads to a decrease, respectively an increase, in the value X.

According to an embodiment, a first capacitor is connected between the base and the emitter of the first of the above-mentioned two bipolar transistors and a second capacitor is connected between the base and the emitter of the second of these two bipolar transistors.

This allows blocking of the electromagnetic interference-induced base-emitter voltage variations for each of the two transistors.

According to another embodiment, a first capacitor is connected between the base and emitter of the first of the two bipolar transistors mentioned above and no capacitor is connected between the base and emitter of the second of the two bipolar transistors.

This allows blocking of base-emitter voltage variations induced by electromagnetic interference only for the first transistor.

In such an embodiment, preferably, the first bipolar transistor is the one of the two bipolar transistors that operates with the lowest current density in its base-emitter PN junction, or, in other words, the one with the largest emitter area. Indeed, the impact of base-emitter voltage variations on the value of the temperature-stable signal generated by the two bipolar transistors, and thus on the value of the reference signal provided by the circuit, is greater in this first transistor.

The person skilled in the art is able to choose the capacitance value of the capacitor connected between the base and the emitter of the first or second transistor so that the capacitance filters the base-emitter voltage variations induced by the electromagnetic interference of the circuit. For example, a capacitance value of the capacitor at least five times, preferably at least ten times, greater than the capacitance value of the intrinsic capacitance of the PN junction between the base and emitter of the transistor to which that capacitor is connected is sufficient.

Particular examples of embodiments will now be described in connection with FIGS. 1 to 3, with the understanding that the present description is not limited to these specific embodiments.

FIG. 1 represents an embodiment of a band-gap circuit for generating a reference signal, the circuit being referenced 1 in FIG. 1.

The circuit 1 comprises a first bipolar transistor 100 and a second bipolar transistor 102. In FIG. 1 the transistors 100 and 102 are of the NPN type. The transistors 100 and 102 are configured so that the difference between the base-emitter voltage Vbe1 of the transistor 100 and the base-emitter voltage Vbe2 of the transistor 102 varies proportionally with the temperature of the circuit 1. In other words, the transistors 100 and 102 are configured to generate a current that varies proportionally with the temperature.

A capacitor C1 is connected between the base 100*b* and the emitter 100*e* of the transistor 100, and optionally but preferably a capacitor C2 is connected between the base 102*b* and the emitter 102*e* of the transistor 102. As an example, the capacitance value of the component C1 is at least five times, preferably at least ten times, larger than the capacitance value of the base-emitter junction of the transistor 100. As an example, the capacitance value of the component C2 is five times, preferably at least ten times, larger than the capacitance value of the base-emitter junction of the transistor 102. In this regard, it will be understood that the capacitors C1, C2 are neither a parasitic capacitance nor an intrinsic capacitance.

Preferably, the transistor 100 has a larger emitter area than the transistor 102. Thus, when the same collector current is supplied to each of the transistors 100 and 102, the current density in the base-emitter junction of transistor 100 is lower than that in the base-emitter junction of the transistor 102.

The circuit 1 is a Brokaw band-gap circuit, or, in other words, is of the Brokaw type.

The collector 100*c* of the transistor 100 is connected to one terminal of a resistor R1 of the circuit 1, with the other terminal of the resistor R1 being connected to a node 104. The node 104 is configured to receive a supply potential Vdd. The potential Vdd is positive and referenced to a GND potential, such as ground potential.

The emitter 100*e* of the transistor 100 is connected to one terminal of a resistor R2 of the circuit 1, the other terminal of the resistor R2 being connected to a node 106.

A resistor R3 of the circuit 1 connects the node 106 to a node 108 configured to receive the GND potential. In other words, one terminal of the resistor R3 is connected to the node 106, with the other terminal of the resistor R3 connected to the node 108.

The collector 102*c* of the transistor 102 is coupled to the node 104 by a resistor R4 of the circuit 1. In other words, one terminal of resistor R4 is connected to the collector 102*c*, the other terminal of the resistor R4 being connected to the node 104. The emitter 102*e* of the transistor 102 is, in turn, connected to the node 106.

In the example of FIG. 1, the circuit 1 further comprises an operational amplifier 110. A first input of the amplifier 110, preferably the non-inverting (+) input, is connected to the collector 100*c* of the transistor 100. A second input of the amplifier 110, preferably the inverting (−) input, is connected to the collector 102*c* of the transistor 102. An output of the amplifier 110 is coupled to the base 100*b* and 102*b* of the respective transistors 100 and 102. The bases 100*b* and 102*b* of the transistors 100 and 102 are connected to each other. By way of example, the output of the amplifier 110 is coupled to the bases 100*b* and 102*b* via a resistive divider bridge not shown, or alternatively, is directly connected to the bases 100*b* and 102*b*.

In circuit 1, the amplifier 110 forces the potential of the collectors 100*c* and 102*c* to the same value. Furthermore, the resistance value of the resistors R1 and R4 is identical, implying that the current I1 in the resistor R1 is identical to the current I4 in the resistor R4, thus the collectors 100*c* and 102*c* receive the same current, or in other words, two respective currents but at the same value. Because the emitter area of the transistor 100 is larger than that of the transistor 102, the voltage Vbe1 is smaller than the voltage Vbe2, and a positive voltage V2 is present across the resistor R2. This voltage V2, which corresponds to the difference between voltages Vbe1 and Vbe2, is proportional to the Napierian logarithm of the ratio of the emitter areas of the transistors 100 and 102, and to the temperature of circuit 1. Thus, the current in the resistor R2 is proportional to temperature, as is the voltage V2. By neglecting the base currents of the transistors 100 and 102, the current in the resistor R3 is equal to twice the current I1, and the output voltage of the amplifier 110 is then equal to Vbe2+2*I1*R3. However, the voltage Vbe2 varies in an inversely proportional manner to the temperature. Thus, by selecting an appropriate ratio of the emitter area of transistors 100 and 102 and appropriate resistor values R2 and R3, the output voltage of the amplifier 110 is independent of the temperature. The output voltage of the amplifier 110 is then, for example, the reference voltage provided by the circuit 1. Determining the ratio of the emitter area of the transistors 100 and 102 and the values of the resistors R2 and R3 to obtain a temperature-independent reference voltage is within the scope of the person skilled in the art.

Although the example of an operational amplifier 110 and two resistors R1 and R4 of the same values has been described herein, the person skilled in the art is able to replace these three elements 110, R1, and R4 with any circuit configured so that the current I1 received by the collector 100*c* is equal to the current I4 received by the collector 102*c*, this circuit then couples the collectors 100*c* and 102*c* to the node 104.

In relation to FIG. 1, the case of a Brokaw circuit 1 has been described in which the bipolar transistors 100 and 102 are of the NPN type. However, it is also possible to provide a capacitor between the base and the emitter of one of the bipolar transistors configured to generate a current proportional to the temperature in a Brokaw circuit, in the case where these two transistors are of PNP type, as will now be described relative to FIG. 2.

Figure 2:
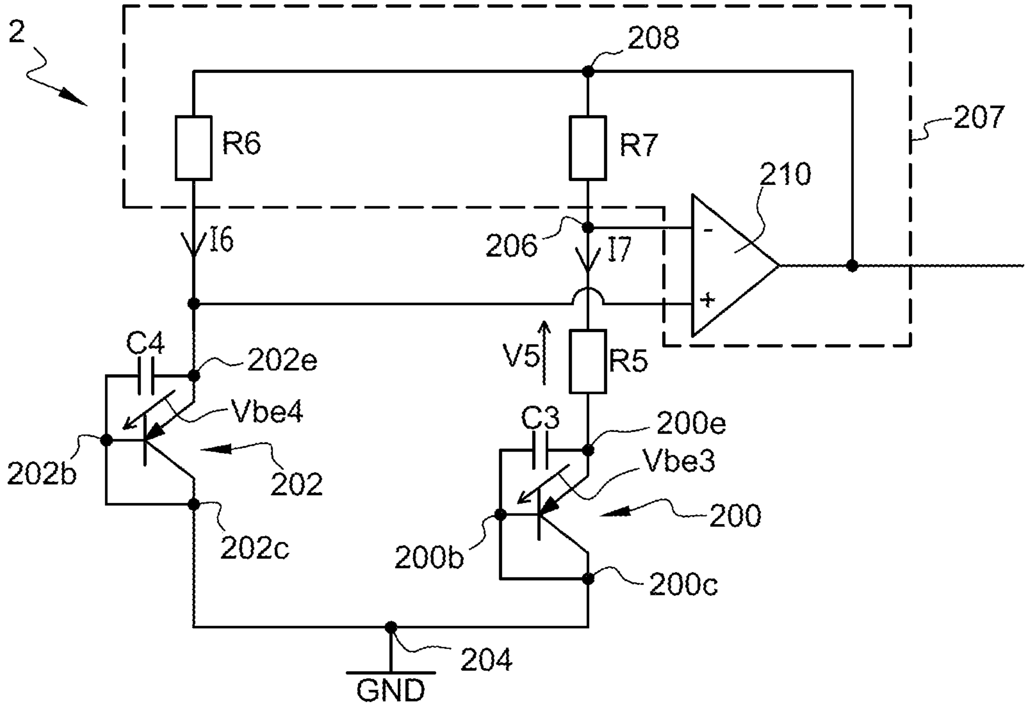
FIG. 2 represents an embodiment of another band-gap circuit for generating a reference signal.

FIG. 2 represents an embodiment of another band-gap circuit for generating a reference signal, the circuit being referenced 2 in FIG. 2.

As with the circuit 1 in FIG. 1, the circuit 2 in FIG. 2 is of the Brokaw type. However, in the circuit 2, the two NPN transistors 100 and 102 are replaced by two PNP bipolar transistors 200 and 202.

The transistors 200 and 202 are configured so that the difference between the base-emitter voltage Vbe3 of the transistor 200 and the base-emitter voltage Vbe4 of the transistor 202 varies proportionally with the temperature of circuit 2. In other words, transistors 200 and 202 are configured to generate a current that varies proportionally with the temperature. Preferably, the transistor 202 has a larger emitter area than transistor 200.

A capacitor C4 is connected between the base 202*b* and the emitter 202*e* of the transistor 202, and optionally but preferably a capacitor C3 is connected between the base 200*b* and the emitter 200*e* of the transistor 200. As an example, the capacitance value of the component C3 is at least five times, preferably at least ten times, larger than the capacitance value of the base-emitter junction of the transistor 200. As an example, the capacitance value of the component C4 is at least five times, preferably at least ten times, greater than the capacitance value of the base-emitter junction of the transistor 202. In this regard, it will be understood that the capacitors C3, C4 are neither a parasitic capacitance nor an intrinsic capacitance.

The base 200*b* and the collector 200*c* of the transistor 200 are connected to a node 204 configured to receive a reference potential GND, such as ground potential. Similarly, the base 202*b* and the collector 202*c* are connected to the node 204. In other words, both bases 200*b* and 202*b* of the transistors 200 and 202 are connected to each other and to node 204. In addition, the emitter 200*e* of the transistor 200 is connected to a node 206 through a resistor R5. In other words, one terminal of the resistor R5 is connected to the emitter 200*e*, with the other terminal of the resistor R5 connected to the node 206.

The circuit 2 further comprises a circuit 207 configured so that a collector current I6 of the transistor 202 is equal to a collector current I7 of the transistor 200. For example, the collector current of the transistor 202, respectively 200, is considered equal to the emitter current of this transistor 202, respectively 200, or, in other words, the base current of the transistor 202, respectively 200, is negligible compared to the emitter and collector currents of this transistor. This circuit 207 is further configured so that the emitter potential 202*e* of the transistor 202 is equal to the potential of the node 206. In this way, the voltage V5 across resistor R5, which corresponds to the difference between the voltages Vbe3 and Vbe4, varies proportionally with the temperature. Furthermore, because the voltage Vbe3 varies in an inversely proportional manner with the temperature, the voltage at the node 206 is the sum of the voltage V5 proportional to the temperature and the voltage Vbe3 which is inversely proportional to the temperature. As before, the person skilled in the art is able to determine the emitter area ratio of transistors 200 and 202 and the value of the resistor R5 so that the node voltage 206 is constant with the temperature. This voltage is, for example, the reference voltage provided by the circuit 2, or may be used as a basis for generating the reference voltage provided by the circuit 2.

In the example represented by FIG. 2, the circuit 207 comprises a resistor R6 connecting the emitter 202*e* to a node 208 configured to receive a positive potential relative to the reference potential GND. In other words, the resistor R6 has one terminal connected to the transmitter 202*e* and another terminal connected to the node 208. In addition, circuit 207 comprises a resistor R7 connecting the node 206 to the node 208. In other words, one terminal of the resistor R7 is connected to the node 206, the other terminal of the resistor R7 being connected to the node 208. The circuit 207 further comprises a circuit 210 configured so that the potential of the node 206 is equal to the potential of the transmitter 202*e*. The circuit 210 is, for example, an operational amplifier having a first input, for example the inverting (−) input, connected to the node 206, and a second input, for example the non-inverting (+) input, connected to the emitter 202*e*. The output of the circuit or amplifier 210 is coupled, for example connected to the node 208. The resistors R6 and R7 have the same resistance value, which forces the currents I6 and I7 to be equal. The reference voltage provided by the circuit 2 is, for example, available at the output of amplifier 210.

The person skilled in the art is able to replace the circuit 207 with another circuit having the same functions, namely equalizing the potential of the node 206 and that of the emitter 202*e* and equalizing the collector currents I6 and I7 of respectively the transistors 202 and 200.

Figure 3:
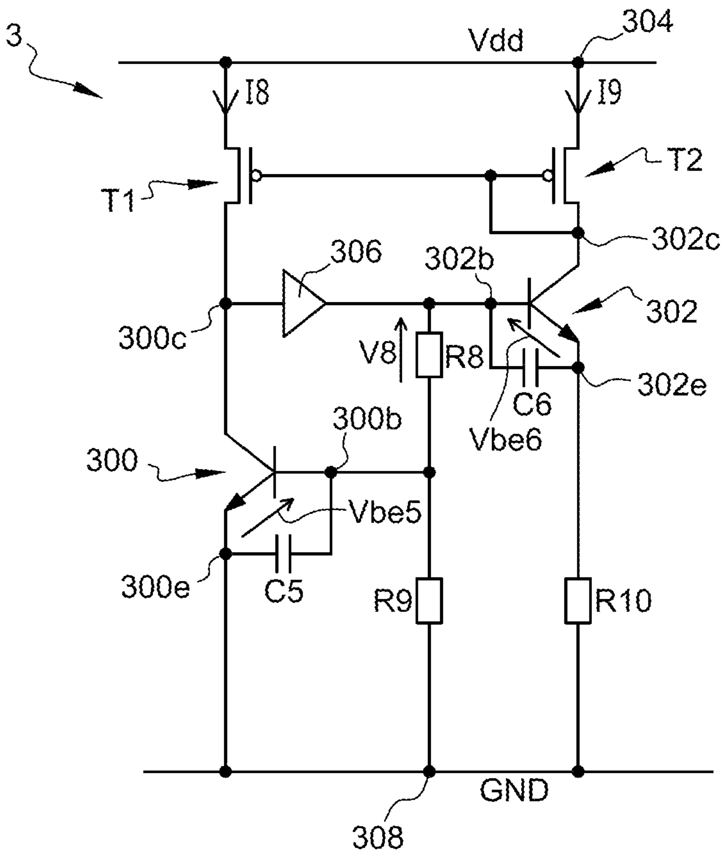
FIG. 3 represents an embodiment of yet another band-gap circuit for generating a reference signal.

FIG. 3 represents an embodiment of yet another band-gap circuit for generating a reference signal, the circuit being referenced 3 in FIG. 3.

The circuit 3 comprises a first bipolar transistor 300 and a second bipolar transistor 302. In FIG. 3 the transistors 300 and 302 are of the NPN type. The transistors 300 and 302 are configured so that the difference between the base-emitter voltage Vbe5 of the transistor 300 and the base-emitter voltage Vbe6 of the transistor 302 varies proportionally with the temperature of the circuit 3. In other words, the transistors 300 and 302 are configured to generate a current that varies proportionally with the temperature.

A capacitor C5 is connected between the base 300*b* and the emitter 300*e* of the transistor 300, and optionally but preferably a capacitor C6 is connected between the base 302*b* and the emitter 302*e* of the transistor 302. Preferably, the transistor 300 has a larger emitter area than the transistor 302.

As an example, the capacitance value of the component C5 is at least five times, preferably at least ten times, larger than the capacitance value of the base-emitter junction of the transistor 300. As an example, the capacitance value of component C6 is at least five times, preferably at least ten times, greater than the capacitance value of the base-emitter junction of transistor 302. In this regard, it will be understood that the capacitors C5, C6 are neither a parasitic capacitance nor an intrinsic capacitance.

The circuit 3 includes a current mirror, preferably using MOS transistors, connected to a node 304 configured to receive a supply potential Vdd. The potential Vdd is positive relative to a reference potential GND, such as ground potential. The current mirror is configured so that the collector current I8 of transistor 300 is equal to the collector current I9 of transistor 302. As an example, the current mirror comprises a P-channel MOS transistor T1 connected between the node 304 and the collector 300*c*, and a P-channel MOS transistor T2 connected between the node 304 and the collector 302*c* of the transistor 302, with the gates of the transistors T1 and T2 being connected to each other, the drain of transistor T2 being connected to the gate of transistor T1, and the sources of transistors T1 and T2 connected to node 304.

The circuit 3 further comprises a follower amplifier 306 whose input is connected to the collector 300*c* of transistor 300, and whose output is connected to the base 302*b* of transistor 302. The amplifier 306 is configured so that the voltage on the base 302*b* of the transistor 302 tracks the voltage on the collector 300*c* of the transistor 300. As an example, the amplifier 306 is an operational amplifier or a bipolar transistor mounted as an emitter follower.

A resistor R8 connects the base 302*b* of transistor 302 to the base 300*b* of transistor 300. For example, one terminal of resistor R8 is connected to base 302*b*, with the other terminal of resistor R8 connected to base 300*b*. A resistor R9 connects the base 300*b* of the transistor 300 to a GND potential application node 308. For example, one terminal of resistor R9 is connected to base 300*b*, with the other terminal of resistor R9 connected to node 308. In addition, a resistor R10 connects the emitter 302*e* of transistor 302 to node 308. For example, one terminal of the resistor R10 is connected to emitter 302*e*, with the other terminal of resistor R10 connected to node 308.

The voltage at the base 302*b* of transistor 302 is equal to the sum of the voltage Vbe5, which varies inversely with temperature, and a voltage V8 at the terminals of resistor R8, which varies proportionally with temperature. Indeed, the voltage V8 is determined by the difference between the voltages Vbe6 and Vbe5, which is proportional to the temperature. Thus, with appropriate resistance values of resistors R8, R9 and R10 and an appropriate emitter area ratio of transistors 300 and 302, the voltage on base 302*b* is independent of temperature. The selection of an area ratio and resistor values to achieve this temperature-independent reference voltage is within the ability of the person skilled in the art.

Although the transistors 300 and 302 of circuit 3 are NPN, the person skilled in the art is able to provide a circuit functionally equivalent to circuit 3 but in which the transistors 300 and 302 allowing the generation of a signal (current or voltage) varying proportionally with temperature are PNP transistors.

More generally, the person skilled in the art is able to provide a capacitor between the base and the emitter of at least one of the two bipolar transistors of other known band-gap circuits for generating a reference signal, for example a Widlar circuit (see, U.S. Pat. No. 3,320,439, incorporated herein by reference), in which these two bipolar transistors are of the same type and are configured to generate a current (or voltage) proportional to temperature.

To this end, the person skilled in the art may implement the following manufacturing method.

In a first step of the method, a known band-gap circuit for generating a reference signal, which comprises a first bipolar transistor and a second bipolar transistor of a same type among PNP and NPN types, and wherein these two transistors are configured to generate a current varying proportionally with temperature, is selected. Then, electromagnetic interference of the selected circuit is simulated. In other words, a simulation of the selected circuit subjected to electromagnetic interference is implemented. As an example, this simulation consists of simulating the operation of the circuit by adding a radio frequency AC voltage between the base and the emitter of the first transistor only, and then between the base and the emitter of the second transistor only, this voltage simulating the effect of an electromagnetic interference.

In a next step of the method, from the results of the simulation, the one of the first and second transistors that causes the most variation in the value of the reference signal provided by the circuit, when the circuit is subjected to electromagnetic interference, is identified. Taking the example described in relation to the first step of the method, this amounts, for example, to identifying on which of the first and second transistors the application of the radio-frequency alternating voltage causes the most variation in the value of the reference signal provided by the circuit. It is, for example, the one of the first and second transistors that has the larger emitter area.

In a next step, the circuit is manufactured by adding a capacitor connected between the base and emitter of the one of the first and second transistors identified in the previous step. Preferably, the circuit is manufactured by further adding another capacitor connected between the base and the emitter of the other of the first and second transistors.

For example, in the embodiments described above, the capacitors connected between the base and the emitter of the bipolar transistors are metal-insulator-metal (MIM) capacitors implemented in a back-end-of-line (BEOL) interconnect structure of the reference signal generating integrated circuit.

The described embodiments of band-gap circuits for generating a reference signal comprising two bipolar transistors configured to generate a current proportional to the temperature can be used in a great many electronic systems or circuits, for example in a power-on reset circuit (POR).

Figure 4:
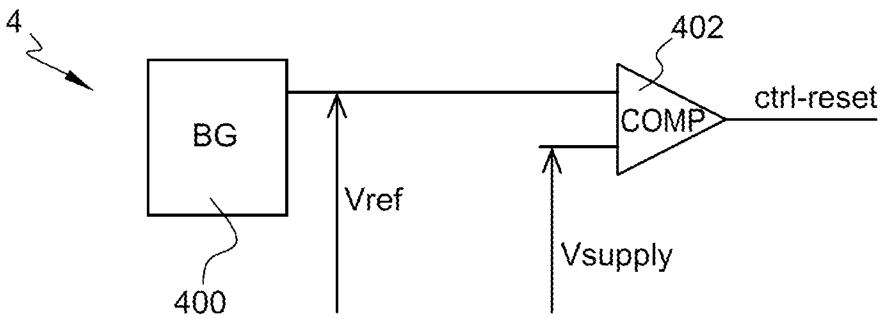
FIG. 4 represents, in a very schematic manner and in block form, a circuit comprising a band-gap circuit for generating a reference signal according to an embodiment.

FIG. 4 represents, very schematically and in block form, a circuit 4 comprising a band-gap circuit for generating a reference signal according to an embodiment. The circuit 4 is a power-on reset circuit.

In FIG. 4, the reference signal generation circuit is referenced 400 ("BG" block) and is of the type previously described. In other words, the circuit 400 comprises two bipolar transistors of the same type, configured to generate a signal proportional to the temperature. As an example, the circuit 400 is one of the circuits 1, 2, and 3 described above.

The circuit 400 provides a temperature-stable reference voltage Vref, or, put differently, a value that is independent of the temperature.

The circuit 400 further comprises a voltage comparator 402 ("COMP" block). The comparator 402 is configured to receive the reference voltage Vref and a supply voltage Vsupply. The comparator 402 is further configured to provide a binary ctrl-reset signal whose state is representative of a comparison of the voltage Vsupply with the voltage Vref.

As an example, when the ctrl-reset signal switches to a binary state indicating that the voltage Vsupply is less than the voltage Vref, the circuit 4 initiates a reset to zero, or restart, of circuits (not represented) that are powered by the voltage Vsupply.

According to an embodiment not represented, a band-gap circuit or power-on reset circuit as described above is provided in a smartphone. Indeed, in a smartphone, the various electronic components are generally arranged close to each other. Thus, the band-gap circuit, when arranged in proximity to an antenna of the phone, is subject to electromagnetic interference resulting from the signals received by the antenna.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove.

The invention claimed is:

1. A circuit, comprising:
- a band-gap circuit for generating a bandgap reference signal, comprising:
  - a first bipolar transistor;
  - a second bipolar transistor;
  - wherein the first and second bipolar transistors are of a same type;
  - wherein an emitter of the first bipolar transistor is coupled to a supply node;
  - a first resistor coupled between a base of the first bipolar transistor and the supply node;
  - a second resistor coupled between an emitter of the second bipolar transistor and the supply node;
  - where a base of the second bipolar transistor is coupled to a collector of the first bipolar transistor; and
  - a third resistor coupled between the base of the first bipolar transistor and the base of the second bipolar transistor;
  - wherein the first and second bipolar transistors are configured to generate a current varying proportionally with temperature; and
- a first capacitor connected between the base and the emitter of one of the first and second bipolar transistors;

wherein:
- the supply node receives a reference potential; and
- further comprising:
  - a follower amplifier having an input coupled to the collector of the first bipolar transistor and an output coupled to the base of the second bipolar transistor; and
  - a current generating circuit configured to cause a collector current of the first bipolar transistor to be equal to a collector current of the second bipolar transistor, said current generating circuit coupled to receive a power supply potential that is positive relative to the reference potential.

2. A bandgap circuit for generating a reference signal, comprising:
- a first bipolar transistor and a second bipolar transistor;
- a first capacitor component having a first electrode connected to a base of the first bipolar transistor and a second electrode connected to an emitter of the first bipolar transistor, wherein the first capacitor component is not a parasitic capacitance or intrinsic capacitance of the first bipolar transistor;
- a MOS transistor current mirror connected to a first node configured to receive a positive power potential with respect to a reference potential, the MOS transistor current mirror being connected to a collector of the first bipolar transistor and to a collector of the second bipolar transistor and being configured so that a collector current of the first bipolar transistor is equal to a collector current of the second bipolar transistor;
- a follower amplifier having an input connected to the collector of the first bipolar transistor and an output connected to a base of the second bipolar transistor;
- a first resistor connected between the base of the second bipolar transistor and the base of the first bipolar transistor;
- a second resistor connected between the base of the first bipolar transistor and a second node configured to receive the reference potential; and
- a third resistor connected between the emitter of the second bipolar transistor and the second node.

3. The circuit according to claim 2, wherein a capacitance value of the first capacitor component is at least five times greater than a capacitance value of an intrinsic capacitance of a base-emitter junction of the first bipolar transistor.

4. The circuit according to claim 2, wherein a capacitance value of the first capacitor component is at least ten times greater than a capacitance value of an intrinsic capacitance of a base-emitter junction of the first bipolar transistor.

5. The circuit according to claim 2, wherein the first bipolar transistor has a first emitter area larger than a second emitter area of the second bipolar transistor.

6. The circuit according to claim 2, further comprising a second capacitor component connected between the base and the emitter of the second bipolar transistor, wherein the second capacitor component is not a parasitic capacitance or intrinsic capacitance of the second bipolar transistor.

7. The circuit according to claim 6, wherein a capacitance value of the second capacitor component is at least five times greater than a capacitance value of an intrinsic capacitance of a base-emitter junction of the second bipolar transistor.

8. The circuit according to claim 6, wherein a capacitance value of the second capacitor component is at least ten times greater than a capacitance value of an intrinsic capacitance of a base-emitter junction of the second bipolar transistor.

* * * * *